US010375017B2

(12) United States Patent
Kakhki et al.

(10) Patent No.: US 10,375,017 B2
(45) Date of Patent: Aug. 6, 2019

(54) DETECTING AND MITIGATING REGISTRAR COLLUSION IN DROP-ADD ACQUISITIONS OF DOMAIN NAMES

(71) Applicant: VERISIGN, INC., Reston, VA (US)

(72) Inventors: Arash Molavi Kakhki, Boston, MA (US); Andrew West, Reston, VA (US); Nipun Jawalkar, Fribourg (CH); Vincenzo Russo, Belp (CH)

(73) Assignee: VERISIGN, INC., Reston, VA (US)

( * ) Notice: Subject to any disclaimer, the term of this patent is extended or adjusted under 35 U.S.C. 154(b) by 403 days.

(21) Appl. No.: 14/985,569

(22) Filed: Dec. 31, 2015

(65) Prior Publication Data

US 2017/0195285 A1 Jul. 6, 2017

(51) Int. Cl.
*H04L 29/12* (2006.01)

(52) U.S. Cl.
CPC ...... *H04L 61/3005* (2013.01); *H04L 61/1511* (2013.01); *H04L 61/302* (2013.01); *H04L 61/3025* (2013.01)

(58) Field of Classification Search
CPC ............. H04L 61/3005; H04L 61/3025; H04L 61/1511
USPC ................................................. 709/245, 232
See application file for complete search history.

(56) References Cited

U.S. PATENT DOCUMENTS

| 9,619,825 | B1* | 4/2017 | Albert ................ G06Q 30/0269 |
| 2002/0091703 | A1* | 7/2002 | Bayles .................. G06Q 40/04 |
| 2002/0091827 | A1* | 7/2002 | King ...................... G06Q 40/04 |
| | | | 709/226 |
| 2004/0167982 | A1 | 8/2004 | Cohen et al. |
| 2004/0228335 | A1* | 11/2004 | Park .................. H04L 29/12066 |
| | | | 370/352 |
| 2007/0214284 | A1 | 9/2007 | King et al. |
| 2008/0010365 | A1* | 1/2008 | Schneider ............ G06Q 10/109 |
| | | | 709/223 |
| 2009/0049198 | A1* | 2/2009 | Blinn ................ H04L 29/12066 |
| | | | 709/245 |
| 2012/0084860 | A1* | 4/2012 | Cao ..................... H04L 63/1441 |
| | | | 726/23 |

(Continued)

OTHER PUBLICATIONS

Extended European Search Report dated May 11, 2017, European Application No. 16206766.4, pp. 1-6.

*Primary Examiner* — David R Lazaro
*Assistant Examiner* — Berhanu Shitayewoldetadik
(74) *Attorney, Agent, or Firm* — MH2 Technology Law Group, LLP (57) ABSTRACT

Systems and method for detecting domain name system (DNS) registrar collusion include a collusion detector at a registry. The collusion detector obtains information related to name acquisition requests submitted by DNS registrars attempting to acquire domain names in a drop pool of expired domain names and provides attempt sets containing the domain names targeted by the DNS registrars for acquisition. Each attempt set contains at least one targeted domain name that a respective DNS registrar attempted to acquire via at least one name acquisition request. The collusion detector determines a degree of similarity between two or more attempt sets corresponding to a pair of the DNS registrars, estimates a likelihood of collusion between the pair of DNS registrars based on the degree of similarity, and performs any mitigation action warranted by the likelihood of collusion.

20 Claims, 6 Drawing Sheets

(56) References Cited

U.S. PATENT DOCUMENTS

2014/0258542 A1   9/2014   Young et al.

* cited by examiner

DETECTING AND MITIGATING REGISTRAR COLLUSION IN DROP-ADD ACQUISITIONS OF DOMAIN NAMES

FIELD

The present disclosure relates generally to analyzing domain name acquisition requests submitted by domain name registrars to detect and mitigate potential drop-add collusion between the domain name registrars.

BACKGROUND

As Internet usage grows exponentially, the demand for Internet-related services is also growing rapidly. As a result of the increased usage of the Internet, the demand for domain names is also growing rapidly. Consequently, demand for domain-related services is also on the rise. Such domain-related services can include domain name creation, domain name registration renewal, and the like. Typically, a website serves as a primary vehicle for establishing an online presence for a domain name. To meet this ever increasing demand for domain name-related services, it is necessary that the entities that provide these services do so in an efficient and cost-effective manner.

The Domain Name System ("DNS") is the part of the Internet infrastructure that translates human-readable domain names into the Internet Protocol ("IP") numbers needed to establish Transmission Control Protocol ("TCP")/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (e.g., labels) separated by dots. The rightmost label in a domain name is known as the top-level domain ("TLD"). Examples of well-known TLDs include .com, .net, .org, .edu, and .gov. Additional examples of TLDs include .biz, .info, and .name. Each TLD supports second-level domains, listed immediately to the left of the TLD, e.g., the "example" level in "www.example.com". Each second-level domain can include a number of third-level domains located immediately to the left of the second-level domain, e.g. the "www" level in www.example.com. The DNS registration system has also evolved to incorporate various country code TLDs ("ccTLDs"), each one reserved for use by a particular country, such as, .ca, .cn, and .us, associated with Canada, China, and the United States, respectively. The DNS and domain name registration system have also evolved to allow the use of alternative character sets to accommodate foreign languages.

The responsibility for operating each TLD, including maintaining a registry of the second-level domains within the TLD, is delegated to a particular organization, known as a domain name registry ("registry"). The registry is primarily responsible for answering queries for IP addresses associated with domains ("resolving"), typically through DNS servers that maintain such information in large databases, and operating its top-level domain. For most TLDs, in order to obtain a domain name, that domain name has to be registered with a registry through a DNS registrar, an entity authorized to register Internet domain names on behalf of end-users. Alternatively, an end-user can register a domain name indirectly through one or more layers of resellers. A registry may receive registrations from hundreds of registrars.

A registrar usually has a dedicated service connection with the registries in order to access domain-related services, e.g., domain name creation or renewal. Registrars typically use the Extensible Provisioning Protocol ("EPP") as a vehicle to communicate with the registries in order to register or renew domain names. EPP is a protocol designed for allocating objects within registries over the Internet. The EPP protocol is based on Extensible Markup Language ("XML"), which is a structured, text-based format. The underlying network transport is not fixed, although the currently specified method is over TCP.

SUMMARY

An authoritative domain name registry responsible for registering and resolving domain names associated with one or more TLDs can perform "domain drops" to release non-renewed domain names associated with the TLDs. Such domain drops can happen on a regular basis (e.g., daily at 2 PM Eastern Time) and can cause intense competition between domain name registrars, which can number in the hundreds or even thousands, to obtain certain non-renewed domain names. The registrars can make acquisition requests to obtain the non-renewed domain names within milliseconds of being dropped, with some acquisition requests failing because the non-renewed domain names have yet to be released (e.g., too early) or have been obtained by other registrars (e.g., too late). End-users (e.g., domainers, domain snipers, etc.) can contract services that attempt to obtain domain names on their behalf. These services can include the registrars directly or "drop-catch" services that leverage an undisclosed network of registrars to attempt domain name acquisition. For example, a registrar can spin off one or more subsidiary registrars to create such a network of registrars to improve their odd of obtaining just-dropped domain names.

Implementations of the present disclosure relate to systems and methods for analyzing the registrars' acquisition requests to detect and mitigate potential drop-add collusion between the registrars. An example drop-add collusion detection system can obtain information related to the acquisition requests from the registry, which can access the totality of the acquisition requests. By analyzing the acquisition requests to identify request patterns, the drop-add collusion detection system can detect the presence of and/or identify the undisclosed network of registrars performing drop-catch services in collusion.

In various implementations, the drop-add collusion detection system includes a collusion detector that can operate at or with the registry to obtain information related to acquisition requests submitted by the registrars attempting to acquire domain names in the registry's a drop pool of expired domain names. The collusion detector can provide attempt sets containing the domain names targeted by the registrars for acquisition, with each attempt set containing at least one targeted domain name that a respective registrar attempted to acquire via at least one acquisition request. The collusion detector can determine a degree of similarity between two or more attempt sets corresponding to a pair of the registrars, estimate a likelihood of collusion between the pair of registrars based on the degree of similarity, and perform any mitigation action warranted by the likelihood of collusion.

It is to be understood that both the foregoing general description and the following detailed description are exemplary and explanatory only and are not restrictive of the implementations, as claimed.

DETAILED DESCRIPTION

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Various implementations of the present disclosure include systems and methods for analyzing DNS registrars' submitted domain name acquisition requests to detect and mitigate potential drop-add collusion between the DNS registrars. An example drop-add collusion detection system can obtain, from a DNS registry, information related to the domain name acquisition requests. The DNS registry, which can be an authoritative domain name registry, can access the totality of the DNS registrars' submitted domain name acquisition requests. By analyzing the domain name acquisition requests to identify request patterns, the drop-add collusion detection system can detect the presence of and/or identify potential drop-add collusion between two or more of the DNS registrars.

The drop-add collusion detection system can provide attempt sets of domain names for the DNS registrars, and catalog domain names targeted by the DNS registrars for acquisition in the respective DNS registrars' attempt sets. The drop-add collusion detection system can analyze the DNS registrars' attempt sets in a pair-wise fashion, for example, by computing degrees of similarity (e.g., intersection, overlap, and the like) between attempt sets corresponding to pairs of the DNS registrars. The drop-add collusion detection system can perform a longitudinal analysis of domain names targeted by the pairs of the DNS registrars, for example, by analyzing attempt sets for the pairs of DNS registrars that contain domain names targeted by the pairs of DNS registrars for acquisition during a series of timeslots longitudinally across a period of time. The drop-add collusion detection system can detect or identify a potential collusion or partnership between a pair of DNS registrars based on the DNS registrar pair's attempt sets' degree of similarity. The identification of the registrar pair's potential collusion can be modified, refined, or enhanced based on certain characteristics, such as (1) when a high degree of similarity occurs over domain names that are "unpopular" among all or many of the DNS registrars' attempt sets and/or (2) when high degrees of similarity during a particular timeslot persist longitudinally across a period of time.

Figure 1:
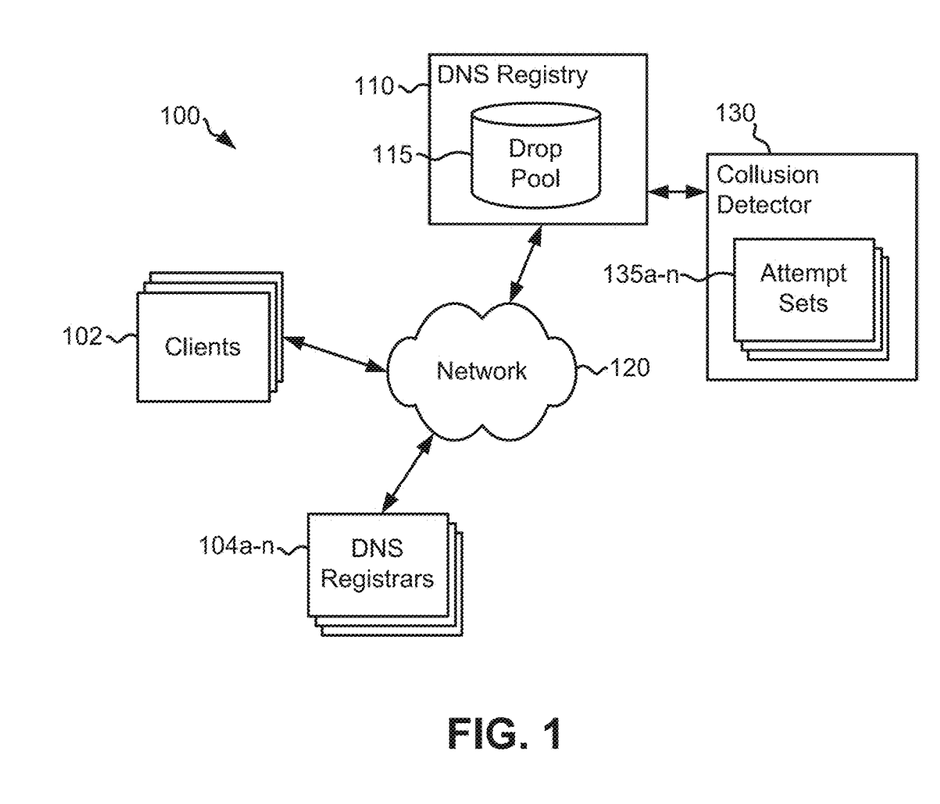
FIG. 1 is a block diagram of an example collusion discovery system that analyzes domain name acquisition requests submitted by DNS registrars to detect and mitigate potential drop-add collusion between the DNS registrars, consistent with implementations of the present disclosure.

By way of a non-limiting example, FIG. 1 illustrates a system 100 that analyzes domain name acquisition requests submitted by domain name registrars to detect and mitigate potential drop-add collusion between the domain name registrars. Components and entities in system 100 can be implemented through hardware, software, and/or firmware. The arrangement and number of components and entities in system 100 is not limited to what is shown. Other variations in the arrangement and number of components and entities are possible, consistent with implementations of the present disclosure. System 100 can include clients 102 and multiple DNS registrars 104a-n, which can be communicatively coupled to at least one DNS registry 110 via at least one network 120. System 100 can also include at least one collusion detector 130 that is communicatively coupled to and/or controlled by DNS registry 110. In various implementations, an example of which is shown in FIG. 1, collusion detector 130 can operate as an independent entity that is communicatively coupled to DNS registry 110. Alternatively or in addition, DNS registry 110 can provide and operate collusion detector 130 as a part of DNS registry 110.

DNS registry 110 can include one or more machines or processors, and can be responsible for operating one or more TLDs and maintaining a registry of second-level domains within the TLDs. DNS registry 110 is primarily responsible for answering queries to resolve IP addresses associated with domain names, typically through DNS servers that maintain such information in large databases. DNS registry 110 can maintain a drop pool 115 of expired domain names that are scheduled to be dropped (e.g., delete pending) from DNS registry 110. Expired domain names can remain in drop pool 115 for a drop period, typically between 30 and 80 days after their expiration, prior to being deleted from DNS registry 110 and made available for DNS registrars 104a-n to register and acquire.

Clients 102 can provide user interfaces for users to interact with DNS registrars 104a-n and DNS registry 110. Users can include individuals, organizations, drop-catch service providers, and the like. One of ordinary skill in the art would understand that clients 102 can send domain name acquisition requests to DNS registrars 104a-n or directly to DNS registry 110. By way of example, clients 102 can be implemented using any device capable of accessing a data network, such as a personal computer equipped with a modem or other network interface. Clients 102 can also be implemented in other devices, such as a mobile device with data access functions (e.g., a smartphone), a personal digital assistant with a network connection, an IP telephony device, or generally any device capable of communicating over a data network. Clients 102 can be associated with one or more webservers that host a website to which a domain name resolves. In addition, clients 102 can be associated with a conventional server that can, for example, host a website, perform name server transactions, perform domain name provisioning services, perform domain name resolution services, communicate with other servers over network 120, etc.

DNS registrars 104a-n can include one or more machines or processors, and can exchange domain name-related information with clients 102 and DNS registry 110. Domain name-related information can include, for example, at least one domain name and its registration status, registration date/time, expiration date/time, registrant/owner, TLD, one or more associated name servers, one or more associated IP addresses, and the like. DNS registrars 104a-n can also submit commands to DNS registry 110 including create, update, transfer, renew, and delete to perform desired operations on domain names. DNS registry 110 can receive and process commands submitted by DNS registrars 104a-n to provide or manage domain name-related information in response to the commands. DNS registrars 104a-n and DNS registry 110 can communicate, for example, via EPP. As described earlier, the default transport for EPP is TCP. However, DNS registry 110 can be configured to receive and transmit EPP messages over Hypertext Transfer Protocol ("HTTP"), HTTP Secure ("HTTPS"), or other network protocols.

In various implementations, DNS registrars 104a-n can serve as drop registrars that attempt to acquire (e.g., dropcatch) one or more of the expired domain names in drop pool 115, and can do so on behalf of clients 102 or other entities, such as DNS registrars 104a-n themselves. For instance, one or more drop registrars of DNS registrars 104a-n can target the expired domain names for acquisition, either in response to one or more acquisition requests from a requesting client of clients 102 or on the drop registrars' own initiative. The drop registrars can attempt to acquire the targeted domain names, for example, by submitting one or more domain name acquisition requests to DNS registry 110. The domain name acquisition requests specify the targeted domain names, and can be submitted as EPP acquisition requests. The domain name acquisition requests can specify one or more of the expired domain names that the drop registrars are targeting for acquisition, and each acquisition request can identify a respective drop registrar that submitted the acquisition request and at least one targeted domain name that the respective drop registrar is attempting to acquire. DNS registry 110 can receive and parse the acquisition requests for information related to the acquisition requests, such as drop registrars that submitted the acquisition requests, expired domain names targeted by the drop registrars via the acquisition requests, timestamps associated with the acquisition requests, and the like. Acquisition request-related information can also include, for example, releasing registrars from which the targeted domain names are being released, timestamps associated with the targeted domain names' expiry or change in ownership, etc.

DNS registrars 104a-n can ascertain the targeted domain names' availability for acquisition, for example, by checking domain name-related records stored locally at the drop registrars and/or querying DNS registry 110. If the targeted domain names are available for the drop registrars to acquire, then the drop registrars can acquire the targeted domain names, for example, by registering the targeted domain names and providing the targeted domain names' registration information to DNS registry 110. Registration information related to a registered domain name can include a registrant, a registration timestamp indicating when the registrant registered the domain name, an expiry indicating when the registration will expire, the registration's duration and continuity, a number of times that the domain name's ownership has changed, a registrar where additional registration information is available, and the like. One of ordinary skill in the art would understand that DNS registrars 104a-n and/or DNS registry 110 can store and provide registered domain names' registration information.

Collusion detector 130 can obtain information related to the domain name acquisition requests that DNS registrars 104a-n submitted to DNS registry 110. From the acquisition request-related information, collusion detector 130 can extract, for example, expired domain names targeted for acquisition and one or more drop registrars of DNS registrars 104a-n that attempted to acquire the targeted domain names. In various implementations, collusion detector 130 can provide multiple attempt sets 135a-n for DNS registrars 104a-n to store and catalog expired domain names targeted by respective DNS registrars 104a-n for acquisition. As described in greater detail infra with respect to FIGS. 2 and 3, collusion detector 130 can catalog each drop registrar's targeted domain names based on, for example, timestamps indicating when the drop registrar attempted to acquire the targeted domain names, TLDs associated with the targeted domain names, releasing registrars from which the targeted domain names are released, and the like. One of ordinary skill in the art would appreciate that a user of DNS registry 110 can query collusion detector 130 for data related to domain name acquisition requests, whether or not collusion detector 130 and DNS registry 110 are collocated. For example, users of DNS registry 110, DNS registrars 104a-n, and clients 102 can query DNS registry 110 for information stored at collusion detector 130 related to domain names and attempts by DNS registrars 104a-n to acquire them.

Figure 2:
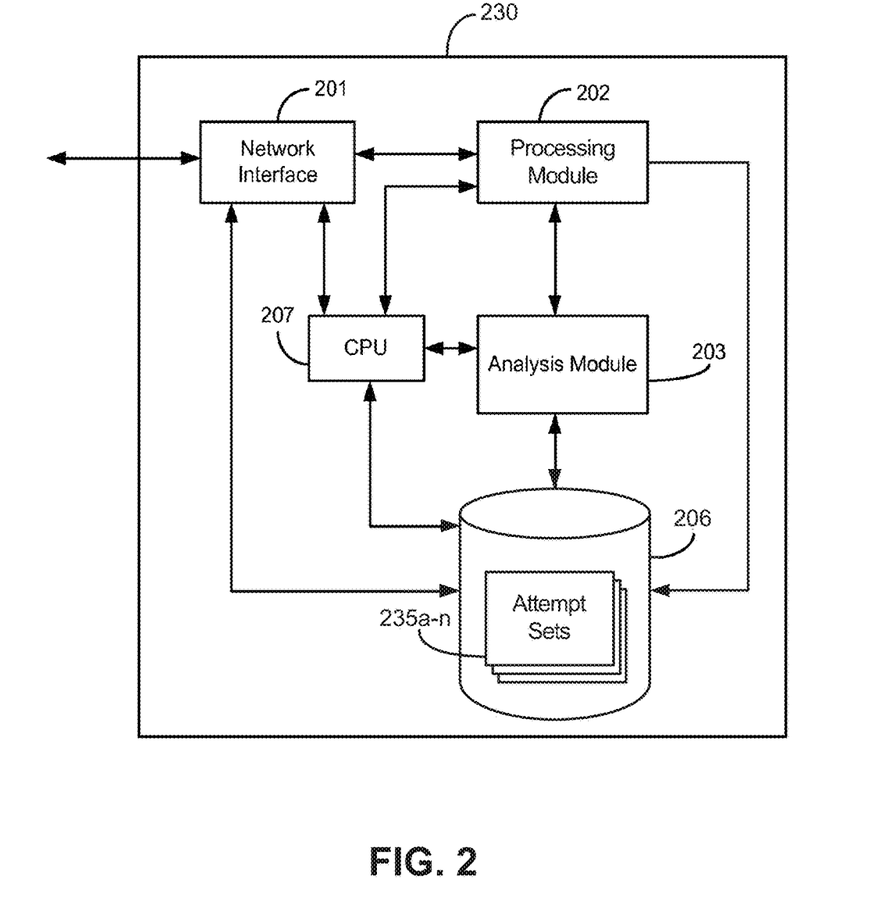
FIG. 2 is a block diagram illustrating an example collusion detector in the collusion discovery system, consistent with implementations of the present disclosure.
Figure 3:
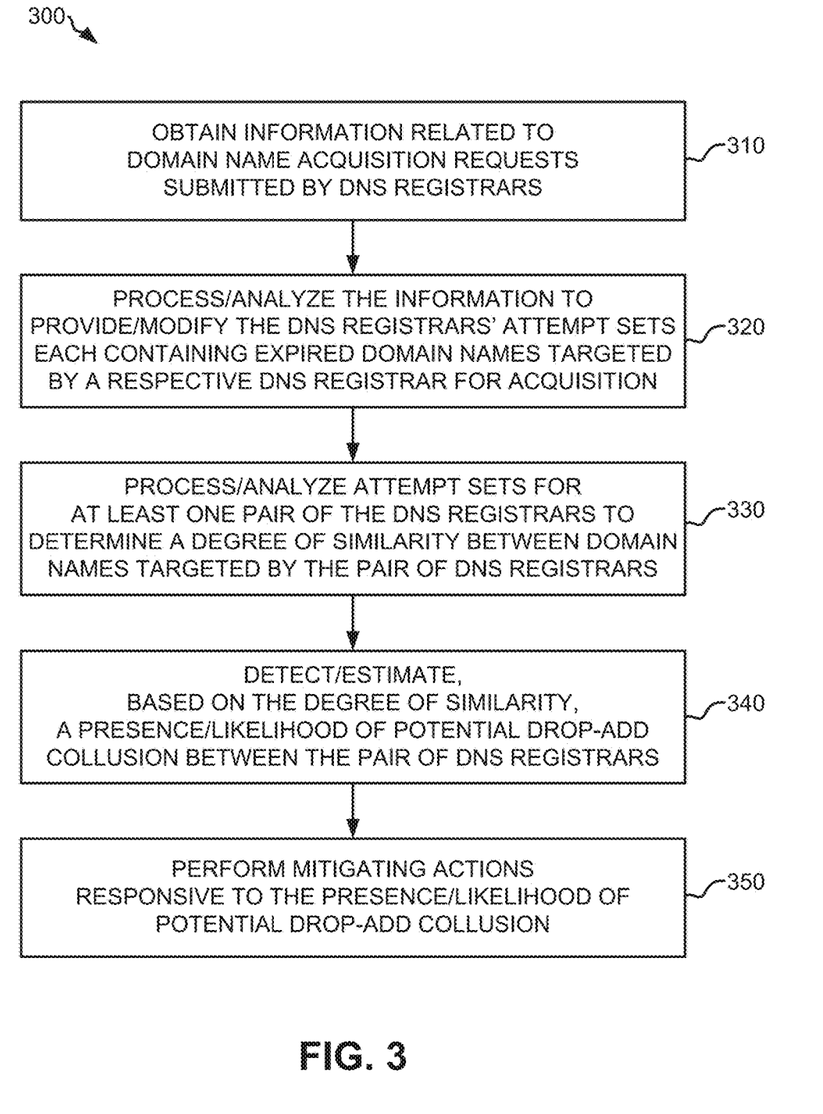
FIG. 3 is a flow diagram of an example process performed by the collusion detector to analyze the DNS registrars' domain name acquisition requests and detect and/or mitigate potential drop-add collusion between the DNS registrars, consistent with implementations of the present disclosure.

As described in greater detail infra with respect to FIGS. 2 and 3, collusion detector 130 can process and analyze the domain names and other acquisition request-related information cataloged in attempt sets 135a-n to determine degrees of similarity between sets of domain names targeted by DNS registrars 104a-n. Attempt sets 135a-n can be processed to improve the accuracy of any detection or estimated likelihood of drop-add collusion. For example, collusion detector 130 can filter attempt sets 135a-n to exclude popular domain names highly targeted by DNS registrars 104a-n or include only unpopular domain names rarely targeted by DNS registrars 104a-n. A domain name can be considered highly targeted if at least a predetermined popular-threshold of number or percentage of DNS registrars 104a-n targeted that domain name for acquisition within a particular window of time. Conversely, a domain name can be considered rarely targeted if less than a predetermined unpopular-threshold number or percentage of DNS registrars 104a-n targeted that domain name for acquisition within a particular window of time. Attempt sets 135a-n can also be filtered to include only or exclude domain names associated with particular TLDs, domain names targeted for acquisition during one or more particular timeslots, duplicative domain names, and the like.

Figure 5:
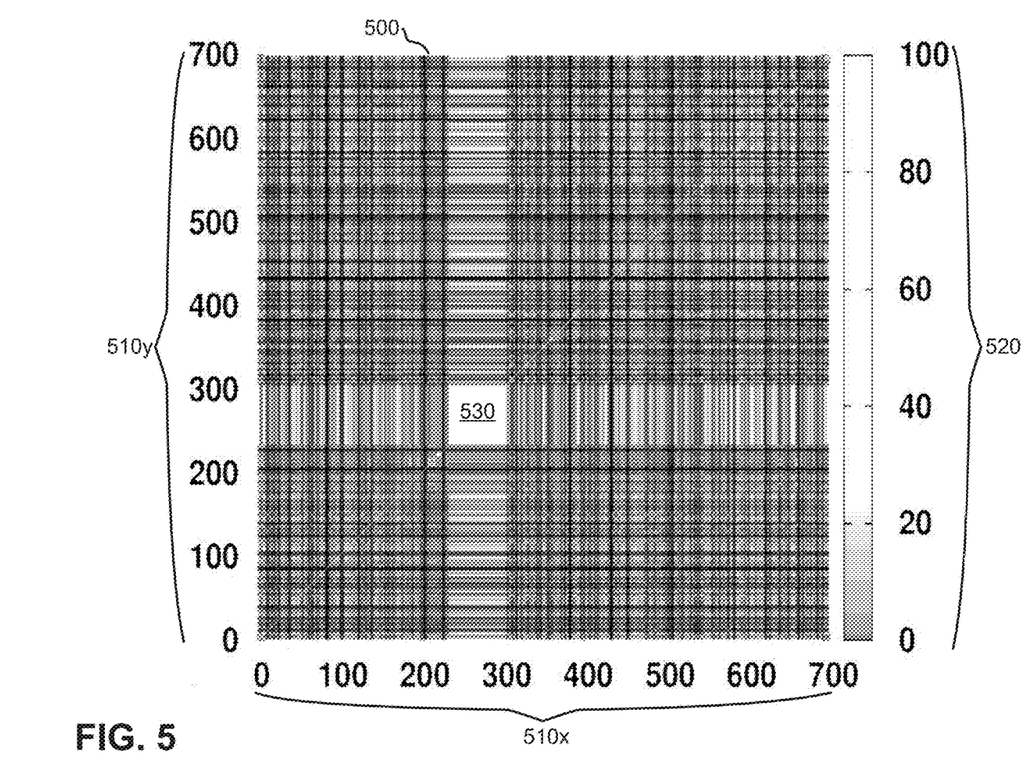
FIG. 5 depicts an example heat map indicating registrar intersection in sets of domain names targeted by DNS registrars for acquisition, consistent with implementations of the present disclosure.

Collusion detector 130 can analyze attempt sets 135a-n to determine a degree of similarity between domain names targeted by DNS registrars 104a-n during one or more particular timeslots based on an overlap between attempt sets 135*a-n* corresponding to DNS registrars 104*a-n* and the one or more timeslots. For example, collusion detector 130 can determine a degree of similarity between domain names targeted by a pair of DNS registrars 104*a-n* during one or more calendar days based on an overlap between attempt sets corresponding to each of the pair of DNS registrars and the one or more calendar days. Collusion detector 130 can generate a heat map indicating a degree of similarity between domain names targeted by DNS registrars 104*a-n* during one or more particular timeslots based on an overlap between attempt sets corresponding to pairs of DNS registrars 104*a-n* and the one or more timeslots. An example heat map is shown in FIG. 5 and described in greater detail infra.

Collusion detector 130 can also perform a longitudinal analysis of attempt sets 135*a-n* to determine a degree of similarity between domain names targeted by one or more pairs of DNS registrars 104*a-n* during a series of timeslots longitudinally across a period of time. For example, collusion detector 130 can determine an intersection or overlap between the registrar pairs' attempt sets that contain domain names targeted by the registrar pairs for acquisition during the series of timeslots over the period of time. For instance, attempt sets for the registrar pairs containing domain names targeted by the registrar pairs for acquisition on a series of Mondays over a three-month period can be analyzed to detect the presence of and/or identify potential drop-add collusion between the registrar pairs during the period of time.

Collusion detector 130 can estimate a likelihood of potential drop-add collusion between a pair of DNS registrars 104*a-n* based on the degree of similarity between sets of domain names targeted by the pair of DNS registrars. If the likelihood of potential drop-add collusion between the pair of DNS registrars satisfies at least one predetermined threshold, then collusion detector 130 can act to mitigate the potential drop-add collusion. For example, collusion detector 130 can log the potential drop-add collusion between the pair of DNS registrars, notify DNS registry 110 or a user thereof of the potential drop-add collusion, send a request for DNS registry 110 to throttle or block current and/or future domain name acquisition requests from one or both of the pair of DNS registrars, and the like.

Network 120 provides communication channels between or among the various components and entities depicted in system 100. Network 120 can be a shared, public, or private network or a hybrid thereof, and can encompass a wide area or local area. Network 120 can be implemented through any suitable combination of wired and/or wireless communication networks. Examples of wireless communication networks include Wi-Fi networks, global system for mobile communications/general packet radio services networks, time division multiple access networks, code division multiple access networks, cloud-based networks, Bluetooth networks, near-field communication networks, and the like. By way of example, network 120 can be implemented through a wide area network, local area network, a private network (e.g., an intranet), a public network (e.g., the Internet), or a combination thereof. Further, the components and entities of system 100 can be connected to multiple networks, such as, for example, to a wireless carrier network, a private data network, and the public Internet.

By way of a non-limiting example, FIG. 2 illustrates a drop-add collusion detector 230 (e.g., collusion detector 130 as shown in FIG. 1) that can detect and mitigate potential drop-add collusion between DNS registrars by analyzing domain names targeted by the DNS registrars for acquisition. For instance, a drop-add collusion discovery system (e.g., system 100) can include drop-add collusion detector 230 to detect and mitigate potential drop-add collusion between drop registrars (e.g., DNS registrars 104*a-n*). Drop-add collusion detector 230 can detect potential drop-add collusion by processing and analyzing information related to the domain name acquisition requests that the drop registrars submitted to at least one registry (e.g., DNS registry 110). Components and entities in drop-add collusion detector 230 can be implemented through hardware, software, and/or firmware. The arrangement and number of components and entities in drop-add collusion detector 230 is not limited to what is shown. Other variations in the arrangement and number of components and entities are possible, consistent with implementations of the present disclosure.

In various implementations, an example of which is shown in FIG. 2, drop-add collusion detector 230 can include interconnected components such as a network interface module ("NIM") 201, a processing module 202, an analysis module 203, a storage 206, a central processing unit ("CPU") 207, etc. NIM 201 can be configured to communicate with external systems and networks using any one of the conventional wired or wireless mediums. NIM 201 can provide network interfaces accessible by the registry or other entities in the drop-add collusion discovery system via at least one network (e.g., network 120). In addition, NIM 201 can obtain the acquisition request-related information from the registry or the other entities over any protocol in the IP suite, such as, for example, TCP/IP, HTTP, HTTPS, etc.

Processing module 202 can process and analyze the acquisition request-related information to provide multiple attempt sets 235*a-n* of domain names that the drop registrars attempted to acquire via the acquisition requests. Prior to modifying attempt sets 235*a-n*, processing module 202 can process the acquisition request-related information according to one or more requirements, examples of which include filtering the acquisition request-related information based on the domain names' TLDs or registration status, the drop registrars that attempted to acquire the domain names, timestamps indicating when the acquisition requests were submitted by the drop registrars or received by the registry, etc. For example, processing module 202 can filter the acquisition request-related information to include only or exclude all information related to acquisition requests submitted by one or more particular drop registrars or during one or more particular timeslots, acquisition requests that targeted particular domain names (e.g., domain names in one or more particular TLDs, domain names that have expired, etc.), and the like, or any combination thereof.

Processing module 202 can provide any whole number of attempt sets for each drop registrar to store and catalog domain names targeted by the drop registrar for acquisition based on the acquisition request-related information. Processing module 202 can categorize each drop registrar's targeted domain names based on timestamps indicating when the drop registrar attempted to acquire the targeted domain names, TLDs associated with the targeted domain names, releasing registrars from which the targeted domain names are released, and the like. For example, processing module 202 can provide each drop registrar with separate attempt sets for different TLDs (e.g., .com, .net, .org, or another gTLD), timeslots (e.g., daily slots, hourly slots, etc.), releasing registrars, etc., and categorize the drop registrar's targeted domain names by storing each targeted domain name in an attempt set for the drop registrar that corresponds to a TLD associated with the targeted domain name, a timeslot during which the targeted domain name was targeted for acquisition, a releasing registrar from which the targeted domain name is released, and the like, or any combination thereof.

Analysis module 203 can process and analyze attempt sets 235a-n to detect or estimate a likelihood of potential drop-add collusion between the drop registrars. Analysis module 203 can process attempt sets 235a-n to improve the accuracy of any detection or estimated likelihood of drop-add collusion by filtering particular domain names from attempt sets 235a-n. For example, analysis module 203 can identify popular domain names that are highly targeted by the drop registrars for acquisition and therefore are present in a significant number or percentage of attempt sets 235a-n (i.e., targeted by a number or percentage of the drop registrars that equals or exceeds a popular threshold), and then remove the highly-targeted domain names from attempt sets 235a-n. Alternatively or in addition, analysis module 203 can identify unpopular domain names that are rarely targeted by the drop registrars for acquisition and therefore are present in only a few of attempt sets 235a-n (i.e., targeted by a number or percentage of the drop registrars that falls below an unpopular threshold), and then remove the all domain names other than the rarely-targeted domain names from attempt sets 235a-n. Analysis module 203 can also filter attempt sets 235a-n to include only or exclude domain names associated with particular TLDs, domain names targeted for acquisition within particular timeslots, duplicative domain names, and the like, or any combination thereof.

Analysis module 203 can analyze attempt sets 235a-n to determine a degree of similarity between sets of domain names targeted by the drop registrars based on an intersection or overlap between attempt sets 235a-n corresponding to the drop registrars. In various embodiments, the sets of domain names can be targeted by the drop registrars during one or more particular timeslots. For example, analysis module 203 can determine a degree of similarity between sets of domain names targeted by a pair of the drop registrars for acquisition during one or more calendar days based on an overlap between attempt sets corresponding to each of the pair of drop registrars and the one or more calendar days. Analysis module 203 can generate a heat map indicating a degree of similarity between domain names targeted by the drop registrars during one or more particular timeslots based on an overlap between attempt sets corresponding to pairs of the drop registrars and the one or more timeslots. Analysis module 203 can perform a longitudinal analysis of attempt sets 235a-n to determine a degree of similarity between domain names targeted by the drop registrars for acquisition during a series of timeslots across at least one period of time based on an overlap between attempt sets 235a-n corresponding to the drop registrars and the one or more timeslots across the period of time. For example, analysis module 203 can determine a degree of similarity between domain names targeted by a pair of the drop registrars for acquisition during one or more weekdays (e.g., Mondays and Fridays) across multiple weeks (e.g., over a three-month period) based on an overlap between attempt sets for the pair of drop registrars and corresponding to the one or more weekdays across the weeks.

Analysis module 203 can estimate a likelihood of potential drop-add collusion between a pair of the drop registrars based on the degree of similarity between sets of domain names targeted by the pair of drop registrars. If the likelihood of potential drop-add collusion between the pair of drop registrars satisfies at least one predetermined threshold, then analysis module 203 can act to mitigate the potential drop-add collusion as described in greater detail infra with respect to FIG. 4. For example, analysis module 203 can log the potential drop-add collusion between the pair of drop registrars in storage 206, notify the registry or a user thereof of the potential drop-add collusion, send a request for the registry to throttle or block current and/or future domain name acquisition requests from one or both of the pair of drop registrars, and the like.

Storage 206 can be implemented using any non-transitory computer storage medium, such as disks, flash memory, and the like. Storage 206 can store attempt sets 235a-n, and can also store other information like event logs and program instructions for processing and analyzing incoming information related to the domain name acquisition requests, providing and modifying attempt sets 235a-n for the drop registrars based on the acquisition request-related information, detecting potential drop-add collusion or estimating a likelihood thereof based on attempt sets 235a-n, performing actions to mitigate potential drop-add collusion, etc. CPU 207, which can be implemented as one or more integrated circuits (e.g., a conventional microprocessor or microcontroller), can control the operation of drop-add collusion detector 230. CPU 207 can retrieve one or more program instructions stored in storage 206 and execute the one or more programs to instruct and/or cause processing module 202 and/or analysis module 203 to perform certain functions.

Further, while drop-add collusion detector 230 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of devices including electronic devices implemented using any combination of circuitry and software.

FIG. 3 is a flow diagram of a process 300 performed by a drop-add collusion detector (e.g., collusion detector 130 as shown in FIG. 1, drop-add collusion detector 230 as shown in FIG. 2) to detect and/or mitigate drop-add collusion between the DNS registrars by analyzing domain names targeted by the DNS registrars for acquisition, according to implementations of the present disclosure. The drop-add collusion detector can perform process 300 as a standalone detector in the drop-add collusion discovery system or as an integrated component of the registry in the collusion discovery system.

At block 310, the drop-add collusion detector can obtain information related to domain name acquisition requests submitted by the DNS registrars targeting one or more expired domain names in the registry's drop pool (e.g., drop pool 115 as shown in FIG. 1) for acquisition. The acquisition requests can specify one or more of the expired domain names that the DNS registrars are targeting for acquisition, and each acquisition request can identify a respective DNS registrar that submitted the acquisition request and at least one targeted domain name that the respective DNS registrar is attempting to acquire. The drop-add collusion detector and/or the registry can receive and parse the acquisition requests to obtain information related to the acquisition requests, such as the DNS registrars that submitted the acquisition requests, the targeted domain names specified in the acquisition requests, etc. Acquisition request-related information can also include, for example, releasing registrars from which the targeted domain names are being released, timestamps associated with the targeted domain names' expiry or change in ownership, timestamps associated with the acquisition requests, and the like.

Next, at block 320, the drop-add collusion detector can process and analyze the acquisition request-related information to provide or modify attempt sets for the DNS registrars containing domain names targeted by the DNS registrars for acquisition. The acquisition request-related information can be processed according to one or more requirements, examples of which include filtering the acquisition request-related information based on the domain names' TLDs or registration status, the DNS registrars that attempted to acquire the domain names, timestamps indicating when the acquisition requests were submitted by the DNS registrars or received by the registry, etc. For example, the drop-add collusion detector can filter the acquisition request-related information to include only or exclude all information related to acquisition requests submitted by one or more particular DNS registrars or during one or more particular timeslots, acquisition requests that targeted particular domain names, and the like, or any combination thereof.

For each DNS registrar, the drop-add collusion detector can provide any whole number of attempt sets containing domain names targeted by the DNS registrar for acquisition, with each of the attempt sets containing targeted domain names that a respective one of the DNS registrars attempted to acquire via the domain name acquisition requests. The drop-add collusion detector can catalog each DNS registrar's targeted domain names based on, for example, timestamps indicating when the DNS registrar attempted to acquire the targeted domain names, TLDs associated with the targeted domain names, releasing registrars from which the targeted domain names are released, and the like.

At block 330, the drop-add collusion detector can process or analyze attempt sets for at least one pair of the DNS registrars to determine a degree of similarity between the sets of domain names targeted by the pair of DNS registrars for acquisition. The attempt sets can be processed to improve the accuracy of any detection or estimated likelihood of potential drop-add collusion. For example, the drop-add collusion detector can filter the attempt sets to exclude popular domain names highly targeted by the DNS registrars or include only unpopular domain names rarely targeted by the DNS registrars. The attempt sets can also be filtered to include only or exclude domain names associated with particular TLDs, domain names targeted for acquisition during one or more particular timeslots, duplicative domain names, and the like.

The drop-add collusion detector can analyze the pair of DNS registrars' attempt sets in a pair-wise fashion, for example, by computing degrees of similarity between attempt sets corresponding to the pair of DNS registrars. More particularly, the drop-add collusion detector can analyze the pair of DNS registrars' attempt sets to determine a degree of similarity between domain names targeted by the pair of DNS registrars during one or more particular timeslots based on an overlap between attempt sets for the pair of DNS registrars that correspond to the one or more timeslots. For instance, the drop-add collusion detector can determine the degree of similarity between domain names targeted by the pair of DNS registrars during one or more calendar days based on an overlap between attempt sets for each of the pair of DNS registrars that correspond to the one or more calendar days. The drop-add collusion detector can also perform a longitudinal analysis of domain names targeted by the pair of DNS registrars, for example, by analyzing attempt sets for the pair of DNS registrars that contain domain names targeted by the pair of DNS registrars for acquisition during a series of timeslots longitudinally across a period of time. Moreover, a heat map can be generated to indicate degrees of similarity between domain names targeted by pairs of the DNS registrars during one or more particular timeslots based on an overlap between attempt sets corresponding to the pairs of DNS registrars and the one or more timeslots.

Then, at block 340, the drop-add collusion detector can detect a presence of and/or estimate a likelihood of potential drop-add collusion between the pair of DNS registrars. The drop-add collusion detector can detect or identify a likelihood of potential drop-add collusion between the pair of DNS registrars based on the degree of similarity between the attempt sets for the pair of DNS registrars. The detection or likelihood estimation of the pair of DNS registrars' potential collusion can be modified, refined, or enhanced based on certain characteristics, such as (1) when a high degree of similarity occurs over domain names that are unpopular among all or many of the DNS registrars' attempt sets and/or (2) when high degrees of similarity during a particular timeslot persist longitudinally across a period of time. If potential drop-add collusion between the pair of DNS registrars is detected or the likelihood thereof satisfies one or more thresholds, then the drop-add collusion detector can, at block 350, perform any mitigating action warranted by the potential drop-add collusion, as described in greater detail infra with respect to FIG. 4.

It will be appreciated that process 300 described herein is illustrative and that variations and modifications are possible. Acts described as sequential can be executed in parallel, order of acts can be varied, and acts can be modified or combined. For instance, blocks 320 and 330 can be combined to concurrently process and analyze the information related to domain name acquisitions and attempt sets of domain names corresponding to the DNS registrars.

Figure 4:
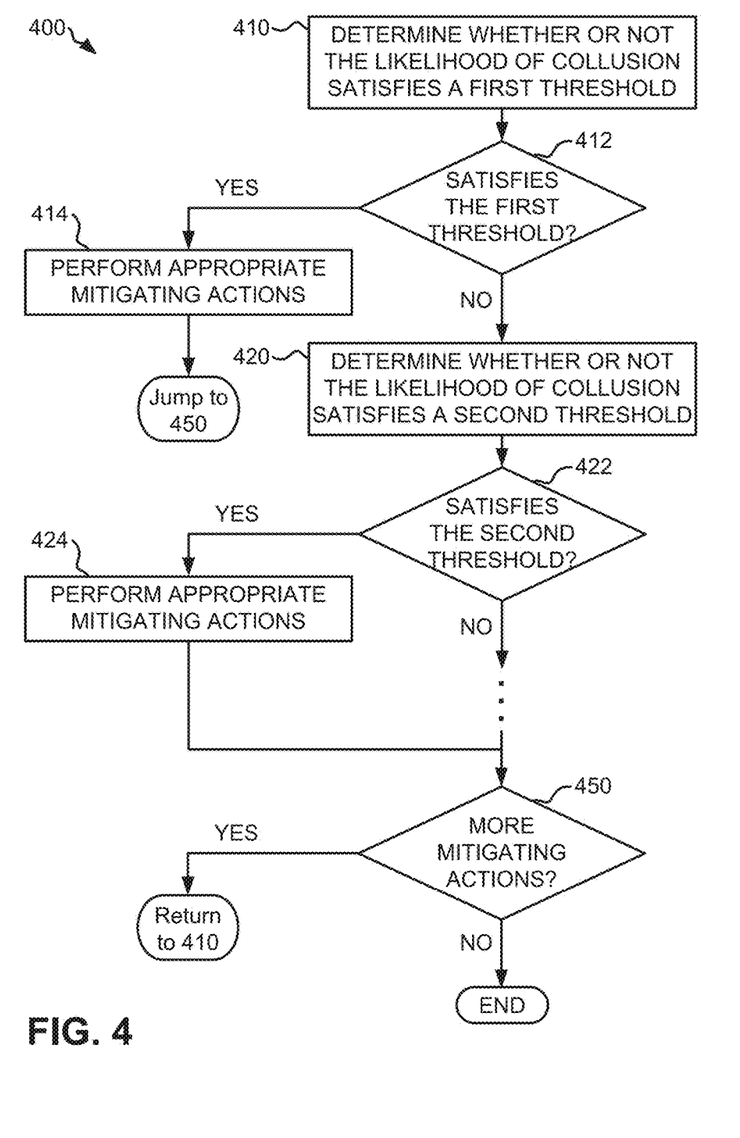
FIG. 4 is a flow diagram of an example process performed by the collusion detector to detect and mitigate potential drop-add collusion between the DNS registrars, consistent with implementations of the present disclosure.

FIG. 4 is a flow diagram of an example process 400 performed by the drop-add collusion detector to detect and mitigate potential drop-add collusion between the DNS registrars, consistent with implementations of the present disclosure. The drop-add collusion detector can determine whether or not an estimated likelihood of or a detected presence of potential drop-add collusion between the pair of DNS registrars satisfies one or more predetermined thresholds and then act accordingly to mitigate the potential drop-add collusion. The drop-add collusion detector can perform process 400 as a standalone detector in the drop-add collusion discovery system or as an integrated component of the registry in the collusion discovery system.

At block 410, the drop-add collusion detector determines whether or not the estimated likelihood of potential drop-add collusion between the pair of DNS registrars satisfies a first threshold. If the estimated likelihood is determined to satisfy the first threshold, then, at block 412, the drop-add collusion detector can proceed to block 414 to perform one or more mitigating actions warranted by the first threshold and subsequently jumps to block 450. Examples of mitigating actions include logging the potential drop-add collusion between the pair of DNS registrars, notifying the registry or a user thereof of the potential drop-add collusion between the pair of DNS registrars, sending a request to the registry to throttle or block current and/or future domain name acquisition requests from one or both of the pair of DNS registrars, and the like.

Alternatively, if at block 410 the estimated likelihood is determined to not satisfy the first threshold, then, at block 412, the drop-add collusion detector can proceed to block 420 and determine whether or not the estimated likelihood of potential drop-add collusion between the pair of DNS registrars satisfies a second threshold lower than the first threshold. If the estimated likelihood is determined to satisfy the second threshold, then, at block 422, the drop-add collusion detector can proceed to block 424 to perform one or more mitigating actions warranted by the second threshold and subsequently jumps to block 450. If at block 420 the estimated likelihood is determined to not satisfy the second threshold, then at block 422, the drop-add collusion detector can determine whether or not the estimated likelihood of potential drop-add collusion satisfies any additional successively lower threshold and perform any warranted mitigating actions. Finally, at block 450, the drop-add collusion detector can determine whether or not additional mitigating actions are warranted. If yes, then processing 400 can return to block 410, or else processing 400 ends.

FIG. 5 depicts an example heat map 500 indicating registrar overlap in sets of domain names targeted by a group of about seven hundred DNS registrars for acquisition during a calendar day, consistent with implementations of the present disclosure. Heat map 500 illustrates pair-wise degrees of similarity between sets of domain names targeted by pairs of the DNS registrars in the group, with the DNS registrar being identified by their respective registrar identification numbers as shown in x-axis 510x and y-axis 510y. An overlap legend 520 shows lighter shades corresponding to higher degrees of similarity between the sets of domain names targeted by the pairs of the DNS registrars. An intersection 530 indicates high degrees of similarity between sets of domain names targeted by DNS registrars numbering from two hundred twenty to three hundred. Based on intersection 530, the drop-add collusion detector can detect a presence of and/or estimate a high likelihood of potential drop-add collusion between those DNS registrars, as well as perform any mitigating actions warranted by the potential drop-add collusion.

While the disclosure has been described with respect to specific implementations, those skilled in the art will recognize that numerous modifications are possible. For instance, the drop-add collusion detection system and the collusion detector can have additional functionalities not mentioned herein. In addition, implementations of the present disclosure can be realized using any combination of dedicated components and/or programmable processors and/or other programmable devices. While the implementations described above can make reference to specific hardware and software components, those skilled in the art will appreciate that different combinations of hardware and/or software components can also be used and that particular operations described as being implemented in hardware might also be implemented in software or vice versa.

While the disclosure has been described with respect to specific implementations, those skilled in the art will recognize that numerous modifications are possible. For instance, the drop-add collusion detection system and the collusion detector can have additional functionalities not mentioned herein. In addition, implementations of the present disclosure can be realized using any combination of dedicated components and/or programmable processors and/or other programmable devices. While the implementations described above can make reference to specific hardware and software components, those skilled in the art will appreciate that different combinations of hardware and/or software components can also be used and that particular operations described as being implemented in hardware might also be implemented in software or vice versa.

Figure 6:
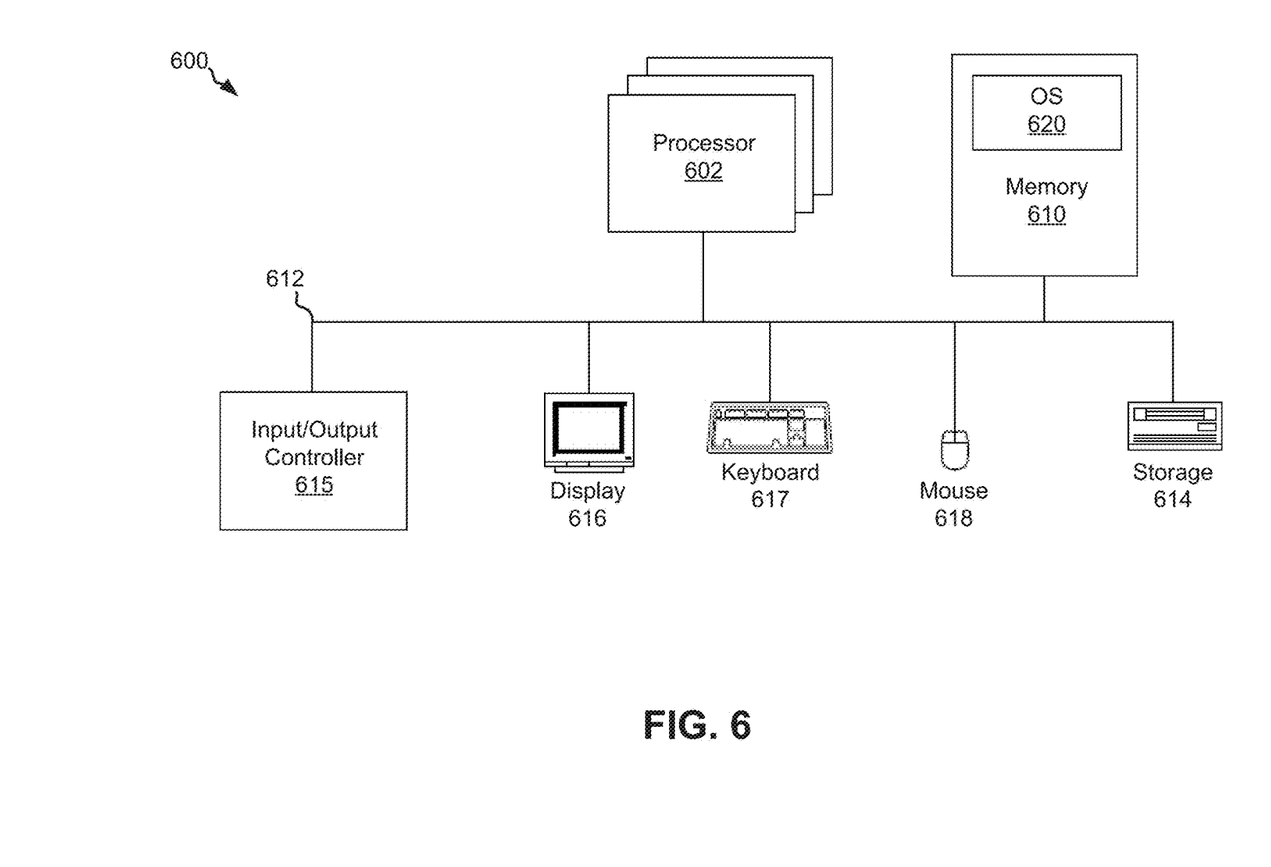
FIG. 6 is an example computer system for performing the disclosed implementations, consistent with the present disclosure.

FIG. 6 illustrates a computer system 600 that is consistent with implementations of the present disclosure. In general, implementations of a drop-add collusion detector (e.g., collusion detector 130 as shown in FIG. 1, drop-add collusion detector 230 as shown in FIG. 2) in a drop-add collusion discovery system (e.g., system 100) may be implemented in various computer systems, such as a personal computer, a server, a workstation, an embedded system, a DNS registry, or a combination thereof. Certain implementations of the collusion detector may be embedded as a computer program. The computer program may exist in a variety of forms both active and inactive. For example, the computer program can exist as software program(s) comprised of program instructions in source code, object code, executable code or other formats; firmware program(s); or hardware description language ("HDL") files. Any of the above can be embodied on a computer readable medium, which include storage devices and signals, in compressed or uncompressed form. However, for purposes of explanation, system 600 is shown as a general purpose computer that is well known to those skilled in the art. Examples of the components that may be included in system 600 will now be described.

As shown, system 600 may include at least one processor 602, a keyboard 617, a pointing device 618 (e.g., a mouse, a touchpad, and the like), a display 616, main memory 610, an input/output controller 615, and a storage device 614. Storage device 614 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program implementation of the drop-add collusion detector can be stored on, for example, storage device 614. System 600 may also be provided with additional input/output devices, such as a printer (not shown). The various components of system 600 communicate through a system bus 612 or similar architecture. In addition, system 600 may include an operating system ("OS") 620 that resides in memory 610 during operation. One skilled in the art will recognize that system 600 may include multiple processors 602. For example, system 600 may include multiple copies of the same processor. Alternatively, system 600 may include a heterogeneous mix of various types of processors. For example, system 600 may use one processor as a primary processor and other processors as co-processors. For another example, system 600 may include one or more multi-core processors and one or more single core processors. Thus, system 600 may include any number of execution cores across a set of processors (e.g., processor 602). As to keyboard 617, pointing device 618, and display 616, these components may be implemented using components that are well known to those skilled in the art. One skilled in the art will also recognize that other components and peripherals may be included in system 600.

Main memory 610 serves as a primary storage area of system 600 and holds data that is actively used by applications, such as the drop-add collusion detector in the drop-add collusion discovery system, running on processor 602. One skilled in the art will recognize that applications are software programs that each contains a set of computer instructions for instructing system 600 to perform a set of specific tasks during runtime, and that the term "applications" may be used interchangeably with application software, application programs, device drivers, and/or programs in accordance with implementations of the present teachings. Memory 610 may be implemented as a random access memory or other forms of memory as described below, which are well known to those skilled in the art.

OS 620 is an integrated collection of routines and instructions that are responsible for the direct control and management of hardware in system 600 and system operations. Additionally, OS 620 provides a foundation upon which to run application software and device drivers. For example, OS 620 may perform services, such as resource allocation, scheduling, input/output control, and memory management. OS 620 may be predominantly software, but may also contain partial or complete hardware implementations and firmware. Well known examples of operating systems that are consistent with the principles of the present teachings include MICROSOFT WINDOWS, MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor (e.g., processor 602), a digital signal processor ("DSP"), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one implementation be plural or distributed, and resources described as multiple or distributed can in implementations be combined. The scope of the present teachings is accordingly intended to be limited only by the following claims. Although the invention has been described with respect to specific implementations, it will be appreciated that the invention is intended to cover all modifications and equivalents within the scope of the following claims.

What is claimed is:

1. A system for detecting domain name system (DNS) registrar collusion, comprising:
   a collusion detector at a DNS registry; and
   a non-transitory memory storing instructions that, when executed by at least one processor of the collusion detector, cause the collusion detector to perform a method comprising:
      obtaining information related to a plurality of name acquisition requests, wherein a plurality of DNS registrars submit the plurality of name acquisition requests attempting to acquire one or more targeted domain names in a drop pool of expired domain names, wherein the drop pool of expired domain names comprises one or more domain names that are scheduled to be dropped from the DNS registry after a registration period of each of the one or more domain names has expired;
      providing, for the plurality of DNS registrars, a plurality of attempt sets containing the one or more targeted domain names, wherein the plurality of attempt sets each contains at least one targeted domain name that a respective DNS registrar of the plurality of DNS registrars attempted to acquire via at least one of the plurality of name acquisition requests;
      determining a similarity of overlap between two or more attempt sets of the plurality of attempt sets corresponding to a pair of DNS registrars of the plurality of DNS registrars;
      estimating a likelihood of collusion between the pair of DNS registrars based on the similarity; and
      performing mitigation actions in response to the likelihood of collusion.

2. The system of claim 1, wherein the instructions cause the collusion detector to further perform providing the plurality of attempt sets by:
   analyzing the plurality of attempt sets for highly targeted domain names, wherein the highly targeted domain names are targeted by at least a predetermined number of the plurality of DNS registrars; and filtering the two or more attempt sets to exclude the highly targeted domain names to provide two or more filtered attempt sets.

3. The system of claim 1, wherein the instructions cause the collusion detector to further perform determining the similarity by:

determining an overlap between two or more attempt sets of the plurality of attempt sets corresponding to the pair of DNS registrars.

4. The system of claim 1, wherein the instructions cause the collusion detector to further perform determining the similarity by:

determining an overlap between two or more attempt sets of the plurality of attempt sets corresponding to the pair of DNS registrars and a timeslot.

5. The system of claim 1, wherein the instructions cause the collusion detector to further perform determining the similarity by:

performing a longitudinal analysis of two or more attempt sets of the plurality of attempt sets corresponding to the pair of DNS registrars and a plurality of timeslots longitudinal across a period of time.

6. The system of claim 1, wherein the instructions cause the collusion detector to further perform determining the similarity by:

generating a heat map indicating registrar overlap based on the two or more attempt sets corresponding to pairs of the plurality of DNS registrars, wherein x- and y-axes of the heat map each corresponds to the plurality of DNS registrars; and determining the similarity between the pairs of DNS registrars based on the heat map.

7. The system of claim 1, wherein the plurality of name acquisition requests include a plurality of Extensible Provisioning Protocol requests.

8. The system of claim 1, wherein the instructions cause the collusion detector to further perform:

filtering the one or more targeted domain names to include only domain names that the plurality of DNS registrars attempted to acquire during one or more timeslots.

9. The system of claim 1, wherein the instructions cause the collusion detector to further perform:

filtering the one or more targeted domain names to include only domain names that are in at least one top-level domain.

10. The system of claim 1, wherein the instructions cause the collusion detector to further perform:

filtering the one or more targeted domain names to exclude domain names that are in at least one top-level domain.

11. The system of claim 1, wherein the instructions cause the collusion detector to further perform providing the plurality of attempt sets by:

removing duplicate domain names in each attempt set of the plurality of attempt sets.

12. The system of claim 1, wherein the instructions cause the collusion detector to further perform:

determining that the likelihood of collusion between the two or more DNS registrars satisfies a predetermined threshold; and blocking at least one name acquisition request from at least one of the two or more DNS registrars.

13. A method for detecting domain name system (DNS) registrar collusion, the method comprising:

obtaining information related to a plurality of name acquisition requests, wherein a plurality of DNS registrars submit the plurality of name acquisition requests attempting to acquire one or more targeted domain names in a drop pool of expired domain names, wherein the drop pool of expired domain names comprises one or more domain names that are scheduled to be dropped from the DNS registry after a registration period of each of the one or more domain names has expired;

providing, for the plurality of DNS registrars, a plurality of attempt sets containing the one or more targeted domain names, wherein the plurality of attempt sets each contains at least one targeted domain name that a respective DNS registrar of the plurality of DNS registrars attempted to acquire via at least one of the plurality of name acquisition requests;

determining a similarity of overlap between two or more attempt sets of the plurality of attempt sets corresponding to a pair of DNS registrars of the plurality of DNS registrars;

estimating a likelihood of collusion between the pair of DNS registrars based on the similarity; and performing mitigation actions in response to the likelihood of collusion.

14. The method of claim 13, wherein providing the plurality of attempt sets further comprises:

analyzing the plurality of attempt sets for highly targeted domain names, wherein the highly targeted domain names are targeted by at least a predetermined number of the plurality of DNS registrars; and filtering the two or more attempt sets to exclude the highly targeted domain names to provide two or more filtered attempt sets.

15. The method of claim 13, wherein determining the similarity further comprises:

determining an overlap between two or more attempt sets of the plurality of attempt sets corresponding to the pair of DNS registrars.

16. The method of claim 13, wherein determining the similarity further comprises:

determining an overlap between two or more attempt sets of the plurality of attempt sets corresponding to the pair of DNS registrars and a timeslot.

17. The method of claim 13, wherein determining the similarity further comprises:

performing a longitudinal analysis of two or more attempt sets of the plurality of attempt sets corresponding to the pair of DNS registrars and a plurality of timeslots longitudinal across a period of time.

18. The method of claim 13, further comprising:

filtering the one or more targeted domain names to include only domain names that the plurality of DNS registrars attempted to acquire during one or more timeslots.

19. The method of claim 13, further comprising:

filtering the one or more targeted domain names to include only domain names that are in at least one top-level domain.

20. A non-transitory computer-readable storage medium including instructions that, when executed by at least one processor at a domain name system (DNS) registry, causes the at least one processor to execute a method for detecting DNS registrar collusion, the method comprising:

obtaining information related to a plurality of name acquisition requests, wherein a plurality of DNS registrars submit the plurality of name acquisition requests attempting to acquire one or more targeted domain names in a drop pool of expired domain names, wherein the drop pool of expired domain names comprises one or more domain names that are scheduled to be dropped from the DNS registry after a registration period of each of the one or more domain names has expired;

providing, for the plurality of DNS registrars, a plurality of attempt sets containing the one or more targeted domain names, wherein the plurality of attempt sets each contains at least one targeted domain name that a respective DNS registrar of the plurality of DNS registrars attempted to acquire via at least one of the plurality of name acquisition requests;

determining a similarity of overlap between two or more attempt sets of the plurality of attempt sets corresponding to a pair of DNS registrars of the plurality of DNS registrars;

estimating a likelihood of collusion between the pair of DNS registrars based on the similarity; and performing mitigation actions in response to the likelihood of collusion.

\* \* \* \* \*